United States Patent [19]

Gun

[11] Patent Number: 5,347,511
[45] Date of Patent: Sep. 13, 1994

[54] TRAFFIC MANAGEMENT IN PACKET COMMUNICATIONS NETWORKS

[75] Inventor: Levent Gun, Durham, N.C.

[73] Assignee: International Business Machines Corp., Armonk, N.Y.

[21] Appl. No.: 73,232

[22] Filed: Jun. 7, 1993

[51] Int. Cl.$^5$ ............................................. H04J 3/02
[52] U.S. Cl. ...................................... 370/54; 370/60
[58] Field of Search ................ 370/60, 60.1, 54, 58.1, 370/58.2, 58.3, 94.1, 94.3

[56] References Cited

U.S. PATENT DOCUMENTS

| | | | |
|---|---|---|---|
| 5,042,027 | 8/1991 | Takase et al. | 370/54 |
| 5,233,604 | 8/1993 | Ahmadi et al. | 370/60 |
| 5,262,906 | 11/1993 | Mazzola | 370/54 |

Primary Examiner—Douglas W. Olms
Assistant Examiner—Min Jung
Attorney, Agent, or Firm—Gerald R. Woods

[57] ABSTRACT

In a packet communications network, the addition or deletion of a connection to the network by a user is governed by a link traffic metric which represents the effective capacity of each link in the network which participates in the packet connection route. A new connection (or deletion) is represented by a compatible metric which allows updates in the link metric by simple vector addition or subtraction. Separate link metrics for a plurality of classes of service permit a much higher efficiency in the exploitation of the link bandwidth than is possible with a single link metric. A packet network using multiple link metrics and efficient metric updating techniques provides increased packet throughput while, at the same time, preserving all class of service guarantees.

15 Claims, 3 Drawing Sheets

| CHARACTERISTIC | | LINK VALUES | | | |
|---|---|---|---|---|---|
| SYMBOL | DESCRIPTION | A | B | --- | N |
| $L_1$ | Real Time Link Metric Vector | $L_{A1}$ | $L_{B1}$ | --- | $L_{N1}$ |
| $L_2$ | Non-Real Time Link Metric Vector | $L_{A2}$ | $L_{B2}$ | --- | $L_{N2}$ |
| $R_{link}$ | Reservable Link Capacity | $R_A$ | $R_B$ | --- | $R_N$ |

TRAFFIC MANAGEMENT IN PACKET COMMUNICATIONS NETWORKS

TECHNICAL FIELD

This invention relates to packet communications networks and, more particularly, to rapid and efficient traffic control in such networks by accurately modeling traffic behavior and accounting for traffic loading in the network.

BACKGROUND OF THE INVENTION

Bandwidth management in modern high speed packet communications networks utilizes connection level controls applied at the time the connection is set up based on the load characteristics of the transmission links in the connection route at the time that the connection is set up. Such connection level controls include bandwidth allocation, path selection, admission control and call setup. Bandwidth allocation is accomplished by noting, at the connection setup time, the "equivalent capacity" loading that the new connection will generate, based on the traffic characteristics of the source signal and the desired quality of service. Using this equivalent capacity as the bandwidth that must be available to carry the new connection, the originating node of the network computes a path to the destination node that is capable of carrying the new connection and providing the level of service required by the new connection. This path selection process utilizes data describing the current state of the traffic in the entire network. Such data can be stored in a topology database located at each entry point, and, indeed, at each node, of the network. If no suitable path can be found to meet these requirements, the connection is rejected. Once a suitable path has been selected at the entry node, a setup message is generated which traverses the selected route, updating the resource allocations for each link visited by the setup message. Due to race conditions, simultaneous requests for setup, or unknown changes in the link resource allocation, the attempt to set up the call may fail because of the lack of necessary resources at the time the call setup message reaches a node along the route. In general, each connection level control process, i.e., initial bandwidth allocation, route selection and call setup, requires adequate network resources to carry the call. A failure at any point in any of these control processes results in the call being rejected, thus preventing the launching of packets likely to cause network overload.

It is essential to successful traffic management and a congestion-free network that the connection level controls operate correctly at all times. Furthermore, in order to efficiently accommodate connections for data streams with widely different characteristics, it is important to allocate bandwidth for each connection with a metric which is readily computable, easily updated and capable of capturing all of the significant characteristics of the highly diversified traffic. Moreover, this metric must also be used to characterize the accumulated transmission link traffic load due to all of the individual connections on that link, determined by a simple additive process from the individual connection vectors. An easily calculated additive metric to characterize traffic on a network is a critical factor for efficient traffic control in the network.

The copending application of the present applicant, and others, Ser. No. 07/932,440, filed Aug. 19, 1992, discloses a metric for both the new connections and for all of the existing traffic on a network, utilizing a link metric vector for each link in the connection. Using statistical multiplexing techniques, the capacity of each link in a proposed route is examined to determine if the new connection can be handled on a statistical basis. A new link metric for the link with the new connection is then the simple vector addition (or subtraction, for disconnect requests) of the connection link vector. The efficiency of these link metric values is, of course, dependent on the enforcement of an access control mechanism that enforces these values.

The algorithm for computing link metrics disclosed in the aboveidentified patent application is computationally efficient, readily allowing for real-time updates of the link metric vectors while, at the same time, accounting reasonably well for the relationship between the link bandwidth and the connection characteristics. This algorithm also preserves the incremental nature of the link metric updates so that information on the individual connections need not be maintained in the network topology database.

Unfortunately, the assumption in the above-identified patent application that all classes of traffic can be adequately accounted for by a single link metric is true only if all of the classes of traffic have similar quality of service requirements. In fact, however, traffic can have very different requirements, particularly in the priority assigned to the data packets in each class. Real-time traffic (e.g., voice and video), for example, should always take priority over non-real-time traffic (e.g., accounting information). That is, real-time traffic demands very small transmission delays, and therefore requires a much greater bandwidth allocation. Using the same link metric for all classes of data can severely reduce the overall throughput of the network since all of the traffic must conform to the same priority treatment. It is therefore often necessary to reserve significantly more bandwidth than is actually required to handle the lower priority classes of traffic when using this prior art single link metric.

SUMMARY OF THE INVENTION

In accordance with the illustrative embodiment of the present invention, a different link metric is used for each different class of traffic, allowing each class of traffic to be more accurately modeled by its own link metric and, even more importantly, permitting the interplay of the different priority traffic to be accurately modeled. This more accurate modeling of the interplay of different traffic classes significantly increases the possible throughput of the links of the network thereby significantly increasing the efficiency of the network.

More particularly, the ability to model real-time and non-real-time traffic with different link metrics permits the optimization of the non-real-time traffic throughput by modifying the non-real-time metrics depending on the real-time traffic level. That is, the priority rules which guarantee the transmission of real-time traffic independent of the level of non-real-time traffic permits a much higher level of non-real-time traffic than would be possible with a single traffic metric which does not take the priority rules into account in controlling traffic levels.

The multiple link metrics of the present invention continue the advantage of the prior art copending application of permitting real-time incremental updates of all link metrics by simple vector addition and subtraction. As before, a connection request with the metrics for the new connection is propagated along the selected route for the connection. At each switching node encountered along this path, the metric in the connection message is used to update the link metrics for the next link in the route. For real-time connections, both the real-time metric and the non-real-time metrics for the next link are updated. For new non-real-time connections, however, only the non-real-time link metrics must be updated. New real-time connections are accepted only if both the resulting real-time and non-real-time link occupancies are less than the effective maximum link capacity. New non-real-time connections are accepted, however, if the resulting non-real-time link occupancy is less than the effective link capacity, regardless of the real-time occupancy.

The strategy of utilizing two or more different link metrics permits the low priority traffic to be increased sufficiently to absorb almost all of the idle time left due to the bursty nature of the high priority traffic, and yet be able to guarantee the prescribed class of service for such high priority traffic.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
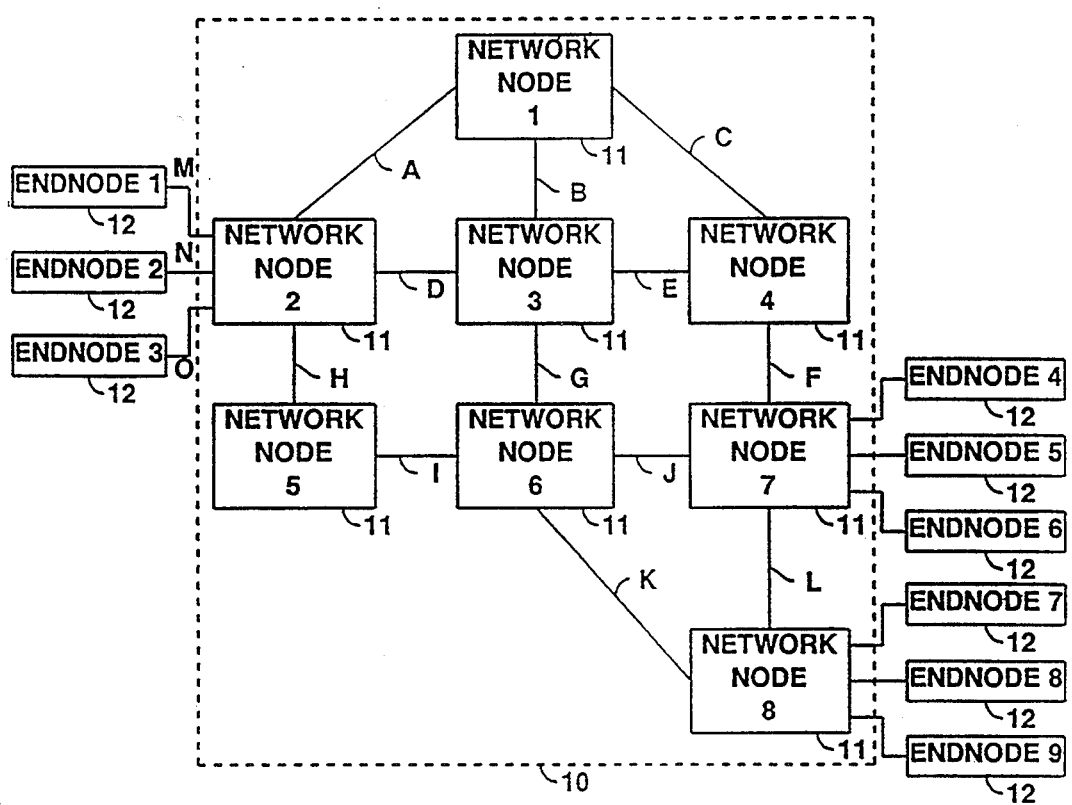
FIG. 1 shows a general block diagram of a packet communications system in which the multiple link metrics determined in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available for the new connection. One such algorithm is disclosed in the copending application, Ser. No. 07/874,917, filed Apr. 28, 1992, and assigned to applicant's assignee. Once such a route is calculated, a connection request message is launched on the network, following the computed route and updating the bandwidth occupancy of each link along the route to reflect the new connection. One such connection request message is shown in FIG. 2.

Figure 2:
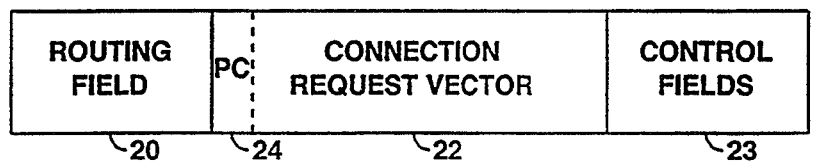
FIG. 2 shows a graphical representation of a connection request message for setting up bandwidth reservations along the route of data packets which might be transmitted on the packet communications network of FIG. 1.

In FIG. 2 there is shown a graphical representation of a connection request message to be launched from a source node in the network of FIG. 1 to a destination node in the network along a precalculated route. The connection message of FIG. 2 comprises a routing field 20 which includes the information necessary to transmit the connection message along the precalculated route. Also included in the connection request message of FIG. 2 is a connection request vector 22 which characterizes the important statistical characteristics of the new packet source and which allows this new source to be statistically multiplexed with the previously existing signals on each link of the route. The connection request vector 22 further includes a priority class (PC) subfield 24 containing a coded identification of the priority class associated with the new connection. Priority subfield 24 may comprise a single bit if only two priority classes are used, or may comprise a larger field to accommodate a larger number of priority classes. As will be discussed in detail hereinafter, the connection request vector includes a relatively few parameters necessary to adequately characterize the packet source. As described in the copending application Ser. No. 07/932,440, filed Aug. 19, 1992, and assigned to applicant's assignee, these parameters might include the mean of the aggregate bit rate for the source, the variance of that bit rate from that mean, and the equivalent bandwidth required to carry the new connection. This copending application, however, required the same set of parameters to be used to characterize all packet sources connected to the network. Since packet sources have widely varied characteristics and priorities, this single set of parameters used to characterize all signal sources required an inefficient representation of the more widely different signal sources (e.g., real-time and non-real-time signals), reducing the accuracy of the representation for both sources and requiring conservative estimates of the bandwidth required to support such sources. As a result, the average occupancy of the various links in the network of FIG. 1 was much lower than desired.

In accordance with the illustrative embodiment of the present invention, the connection request vector 22 is customized for the class of packet source being represented, as identified by subfield 24. Real-time signal sources, for example, are represented by a set of parameters suitable for real-time signals while non-real-time signal sources are represented by a set of parameters more suitable for non-real-time signals. Even more significantly, the portion of the connection vector representing the estimated link bandwidth required to carry the connection can be tailored to reflect the relative priority of the particular signal source. As a result, the occupancy of the various links of the network of FIG. 1 can be increased significantly, and possibly even doubled, without sacrificing the quality of service for the higher priority packets.

As in the prior art connection request vector, the values in the connection request vector are used to test each link of the route to determine if the new connection can actually be supported by that link, and to update, separately for each link, the link occupancy metric to reflect the addition of the new connection. If the link occupancy has changed since the route was calculated, the connection may be rejected at any node along the route, and the source node notified of the rejection. Finally, in FIG. 2, the control fields 23 include additional information used in establishing the connection, but which are not pertinent to the present invention and will not be further discussed here. Note that, when a connection is to be taken down, a connection removal message having the same format as FIG. 2 is transmitted along the route of the connection to be removed. The link occupancy of each link is then updated to reflect the removal of this connection by subtracting the metrics for the removed connection.

Figure 3:
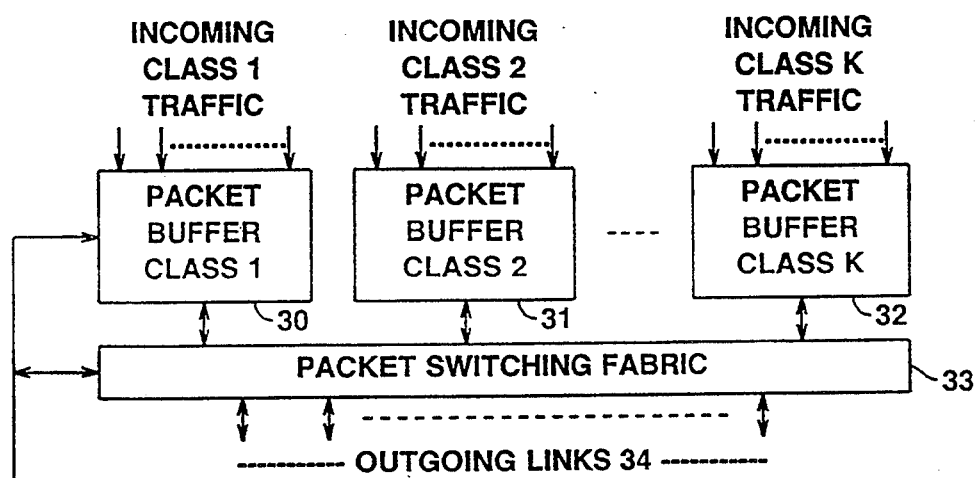
FIG. 3 shows a more detailed block diagram of typical decision point in the network of FIG. 1 at which point packets may enter the network or be forwarded along the route to a destination for each packet.

In FIG. 3 there is shown a general block diagram of a typical packet network decision point such as is found in the network nodes 11 of FIG. 1. The decision point of FIG. 3 comprises a high speed packet switching fabric 33 onto which packets arriving at the decision point are entered. Such packets arrive over transmission links such as links A–L of FIG. 1 (or are originated locally), and are deposited in one of packet buffers 30, 31, . . . , 32, depending on the priority classification of that particular packet. That is, it is assumed that the traffic handled by the packet communications system of FIG. 1 is divided into K different priority classifications. As previously noted, such classifications might include real time and non-real time traffic. System control packets might form another candidate for an even higher priority classification than user traffic. Data packets in each priority classification are accumulated in a corresponding one of buffers 30–32 from which each packet is switched, using switching fabric 33, to an appropriate one of outgoing links 34. Outgoing links 34, of course, correspond to inter-node transmission links A–L of FIG. 1, extending to other nodes, or to local transmission facilities to one of the end nodes 12.

Each source of packets, e.g., each incoming transmission link, can be equipped with its own set of priority buffers 30–32, or a mechanism can be provided to enter packets from different sources into a common set of priority classification buffers 30–32. It should also be noted that one or more of the transmission links 34 can be connected to yet other packet decision points in the same node, thereby expanding the switching capacity of the node. The decision point of FIG. 3 thus serves to connect the packets arriving at a decision point to a local user (for end nodes) or to a transmission link leaving the decision point (for network nodes and end nodes).

A route controller 37 is used to calculate optimum routes through the network for packets originating at a local end node. As previously noted, one technique for calculating optimum routes is disclosed in the copending application Ser. No. 07/874,917, filed Apr. 28, 1992, and assigned to applicant's assignee. Network access controllers 39, one for each connection originating at the decision point of FIG. 3, are used to regulate the launching of packets onto the network if the transient rate of any connection exceeds the values assumed in making the original connection, as disclosed in the aforementioned application Ser. No. 07/932,440, filed Aug. 19, 1992. Both route controller 37 and access controllers 39 utilize the link metric vectors in the connection request message of FIG. 2 for both calculating routes and controlling access, as will be described in detail hereinafter. Controller 37 utilizes link metric vectors representing the traffic on each link of the network, stored in topology data base 38, to calculate the connection route through the network. Network topology data base 38 contains information about all of the nodes and transmission links of the network of FIG. 1, which information is necessary for controller 37 to operate properly.

The controllers 37 and 39 of FIG. 3 may comprise discrete digital circuitry or may preferably comprise properly programmed digital computer circuits. Such a programmed computer can be used to generate headers for packets originating at user inputs to the decision point of FIG. 3, or may modify headers of packets switched at the decision point to facilitate future routing. Similarly, the computer can also be used to calculate feasible routes for new connections and to calculate the necessary controls to regulate access to the network in order to prevent congestion. The information in data base 38 is updated when each new link is activated, new nodes are added to the network, when links or nodes are dropped from the network or when link loads change due to the addition of new connections or the deletion of old connections. Such information originates at the network node to which the resources are attached and is exchanged with all other nodes to assure up-to-date topological information needed for route and access control calculations. Such data can be carried throughout the network on supervisory packets very similar to the information packets exchanged between end users of the network.

The incoming transmission links to the packet decision point of FIG. 3 may comprise links from local end nodes such as end nodes 12 of FIG. 1, or links from adjacent network nodes 11 of FIG. 1. In any case, the decision point of FIG. 3 operates to receive each data packet and forward it on to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communication facilities of the packet network is statistically optimized to carry significantly more traffic than would be possible with dedicated transmission facilities for each communication path.

Figure 4:
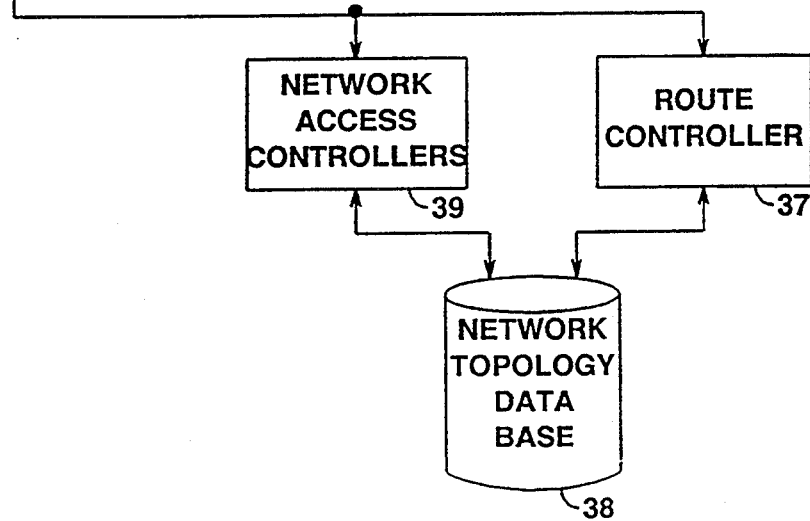
FIG. 4 shows in tabular form a portion of an illustrative topology database at each decision point such as that shown in FIG. 3 showing, however, only two different priority classes (real-time and non-real-time), and which is used to support bandwidth reservation at that decision point.

In FIG. 4 there is shown in tabular form a portion of the information stored in the data base 38 of FIG. 3. As can be seen in FIG. 4, and in accordance with the present invention, a plurality of link metric vectors for each link of the network is stored in the data base, one link metric vector for each priority classification recognized in the network. As an example, FIG. 4 shows two link metric priority classifications, real-time and non-real time. A larger number of priority classifications is, of course, possible, in which case separate link metrics for each classification must be stored in the topological data base of FIG. 4. The link metric vectors are calculated as will be described below. As will also be described hereinafter, these link metric vectors are updated with the addition or deletion of each virtual connection through the network, and adjusted to reflect physical changes in the network. The use of the link metric vectors for call requests will be described in detail in connection with FIG. 5.

In broadband, integrated, packet-switched networks of the form shown in FIG. 1, connections with possibly widely different characteristics (e.g., peak rate, utilization, burst size), as well as priority classification, are allowed to share network links. Despite all of these differences, it is necessary to identify on each network link the current load level or total bandwidth allocated to existing connections. This allocation forms the basis for deciding whether or not new connections can be added to the link without overload occurring.

In accordance with the afore-mentioned copending application Ser. No. 932,440, the allocation of bandwidth is achieved through the definition of a single link metric vector from which the load level on each link can easily be obtained. Such a load metric vector is designed to account for the characteristics of individual connections, while capturing the effect of aggregating many connections with different characteristics. In accordance with this prior application, the link metric L is given by:

$$L = \left( M = \sum_{i=1}^{N} m_i, \Sigma^2 = \sum_{i=1}^{N} \sigma_i^2, \hat{C}^{(N)} = \sum_{i=1}^{N} \hat{c}_i \right) \quad (1)$$

where N is the number of network connections currently multiplexed on the link, $m_i$ is mean of the aggregate bit rate for connection i, $\sigma_i^2$ is the standard deviation of the aggregate bit rate for connection i, and $\hat{C}^{(N)}$ is the sum of N individual equivalent bandwidth capacities, each given by:

$$\hat{c}_i = R_i \left( \frac{y_i - \chi + \sqrt{[y_i - \chi]^2 + 4\chi \rho_i y_i}}{2y_i} \right) \quad (2)$$

where $\chi$ is the buffer capacity, $y_i = \ln(1/\epsilon) b_i (1 - \rho_i) R_i$, where $\epsilon$ is the desired or target buffer overflow probability, and $\rho_i = m_i / R_i$ is the probability that connection i is in the active or burst state, $R_i$ is the peak input rate for the new connection i and $b_i$ is the average duration of the peak period for connection i.

In further accord with the afore-mentioned copending application Ser. No. 932,440, the link bandwidth C allocated to the aggregation of N connections on this link to account both for the effect of statistical multiplexing and for the impact of individual connection characteristics can be calculated from the following approximation:

$$C = \min \left\{ M + \alpha' \Sigma, \sum_{i=1}^{N} \hat{c}_i \right\} = f(L) \quad (3)$$

where, for a buffer overflow probability of $\epsilon$, $\alpha'$ is a constant approximately given by:

$$\alpha' \approx \sqrt{2\ln(1/\epsilon) - \ln 2\pi} .$$

Due to the form of equation (3), the allocated bandwidth can be easily computed as new connections are added or removed. To this end, the topology data base 38 of FIG. 3 maintains, for each link, a link vector in the form of equation (1). Furthermore, the bandwidth request vector for connection i is generated and transmitted in the form:

$$r_i = (m_i, \sigma_i^2, \hat{c}_i).$$

The link metric can now be updated by simple vector addition or subtraction, each time a network connection is added to or removed from that link. That is, in accordance with the prior patent application, a new link vector is obtained incrementally from the existing one by using $L \leftarrow L \pm r_i$, where addition and subtraction are component-wise.

The present invention contemplates the substitution of multiple link metrics for the single link metric of the prior art copending application Ser. No. 932,440. More specifically, the traffic is divided into a plurality of classes of signals having substantially different priorities. Two obviously different priority classifications are those ascribed to real-time and to non-real time traffic. Initially, only two classes of traffic priorities will be considered, corresponding to real-time and non-real-time traffic. Generalization to more than two classes of traffic will then be taken up.

The advantages of multiple link metrics can be better appreciated with the following discussion. Let $l_1$ and $l_2$ be the index set of all of the real-time and non-real-time connections, respectively, on a link. Similarly, let ($\chi_1$, $\epsilon_1$) and ($\chi_2$, $\epsilon_2$) be the resource characteristics for the real-time and non-real-time buffers, respectively, corresponding to buffers 30–32 of FIG. 3, where $\chi$ is the buffer size and $\epsilon$ is the target loss probability for the buffer. Finally, let $\hat{c}_i^{(k)}$ be the equivalent capacity of connection i, relative to the priority classification k, $k=1, 2$, i.e., $\hat{c}_i^{(k)}=\hat{c}_i(\chi_k, \epsilon_k)$, for $k=1,2$, where $\hat{c}_i(\chi_k, \epsilon_k)$ is defined in equation (2).

Using the above definitions, consider an infinite buffer queuing system with two arbitrary arrival sequences $A_1(t)$ and $A_2(t)$, where $t \geq 0$, denoting real-time and non-real-time arrival processes. That is, $A_k(t)$, $k=1,2$, denotes the total work load of each classification arriving into the system by time t. Let $\Pi$ denote the set of all work-conserving scheduling policies for packet transmission. Clearly, the simple pre-emptive and non-pre-emptive policies are in $\Pi$. Since every policy $\pi$ in $\Pi$ is work-conserving, the total workload transmitted by time t, defined as $D(t)$, is independent of the policy $\pi$ used. Therefore, if $D_k^\pi(t)$ denotes the total workload of type k transmitted by time t, then the relationship $D(t)=D_1^\pi(t)+D_2^\pi(t)$ holds for every $\pi$ in $\Pi$. Let $X_k^\pi(t)$ denote the workload in the system at time t due to class k under any scheduling policy $\pi$ in $\Pi$. Then, by flow conservation, $$X_k^\pi(t)=A_k(t)-D_k^\pi(t), \text{ where } k=1,2 \text{ and } t \geq 0. \quad (4)$$

Therefore $$X_1^\pi(t)+X_2^\pi(t)=A_1(t)+A_2(t)-D(t) \equiv X(t) \quad (5)$$

follows for every $\pi$ in $\Pi$, i.e., the total workload $X(t)$ in the system is independent of the service policy. The inequality $$P(X>\chi) \geq P(X_k^\pi>\chi), k=1,2. \quad (6)$$

follows since $X_k^\pi(t) \leq X(t)$ for every $\pi$ in $\Pi$, for every realization of the random variables $X$, $X_1^\pi$ and $X_2^\pi$. Note that this discussion is valid for any arbitrary arrival streams, and not just for on/off processes.

Based on the previous discussion, the present invention utilizes separate link metrics, in the form given in equation (1), for each priority class be kept at each node, i.e., $$L_1 = \left( \sum_{i \in I_1} m_i, \sum_{i \in I_1} \sigma_i^2, \sum_{i \in I_1} c_{i,1} \right) \quad (7)$$

and $$L_2 = \left( \sum_{i \in I_1 \cup I_2} m_i, \sum_{i \in I_1 \cup I_2} \sigma_i^2, \sum_{i \in I_1 \cup I_2} c_{i,2} \right). \quad (8)$$

In view of the discussion above, if the link capacity C is such that $P(X>\chi_2) \leq \epsilon_2$, then, from equation (6), $P(X_2^\pi>\chi_2) \leq \epsilon_2$, for any work-conserving policy $\pi$. Therefore, the required link capacity C can be computed using the approximation developed for the first-come, first-served service discipline reflected in equation (3), i.e., $$C=f(L_2), \quad (9)$$

where $L_2$ is defined in equation (8). Equation (9) provides an upper bound to the required capacity to achieve the target loss probability from non-real-time buffers for any service policy. Since the accounting and admission criterion for non-real-time traffic is based on the link vector $L_2$, the overflow probability from the non-real-time buffer is guaranteed to be within $\epsilon_2$. That is, the performance of the non-real-time traffic is guaranteed when its admission is based on the link vector $L_2$ of equation (8). This allows more non-real-time traffic to be placed on links even though the link is up to its reservable capacity $R_{link}$ according to the link vector $L_1$. Moreover, since the real-time packets have a higher transmission priority, their performance is always guaranteed as long as the condition $$f(L_1) \leq R_{link} \quad (10)$$

is satisfied. However, to protect the performance of non-real-time connections from future real-time connections, the call admission criterion for real-time traffic should also be based on $L_2$, i.e., the condition $$f(L_2) \leq R_{link} \quad (11)$$

should also be satisfied. The inequality (10) ensures that the loss probability from real-time buffer will stay within the target $\epsilon_1$. The inequality (11) ensures that the loss probability for the non-real-time buffers will stay within the target $\epsilon_2$.

It should be first noted that the function $\hat{c}(\chi, \epsilon)$ is monotonically decreasing in both $\chi$ and $\epsilon$. Typically, due to delay and jitter constraints, the real-time buffer size $\chi_1$ is designed to be much smaller than the non-real-time buffer size $\chi_2$. Therefore, as long as the two overflow loss probabilities $\epsilon_1$ and $\epsilon_2$ are of the same order, the relation $\hat{c}_2 < \hat{c}_1$ holds. Therefore, both $f(L_1)$ and $f(L_2)$ are smaller than the total bandwidth allocated on a link as suggested in the prior art copending application Ser. No. 932,440, i.e., $f(L)$. In other words, the present invention permits the placement of both additional non-real-time connections on a link and more real-time connections on the link than would be placed on the link with the prior art algorithm.

The multiple link metrics of the present invention also fixes a potential problem in the prior art for very high speed links. If, on such high speed links, $\chi_1 \approx \chi_2$, and if $\epsilon_1 > \epsilon_2$, then $L \geq L_2$, where L and $L_2$ are as given in equations (1) and (7), respectively, and the vector inequality is componentwise. Therefore, if only one metric is kept for all of the traffic and the admission criterion $f(L) \leq R_{link}$ is used, then the overflow probability objective $\epsilon_2$ of the non-real time traffic may be violated when $f(L) \leq R_{link} \leq C \leq f(L_2)$.

Finally, it should also be noted that the discussion thus far has assumed that the real-time traffic is not at all affected by any of the lower priority classes. This is clearly the case when the scheduling policy is pre-emptive, that is, real-time traffic always takes precedence over non-real-time traffic. If non-pre-emptive scheduling policies are used, it is still possible to guarantee service to the real-time traffic regardless of the volume of the lower priority traffic, i.e., even when the non-reserved buffers are very highly utilized. Let $X_1(t)$ be the real-time workload at time t when the service policy is preemptive. Let $X'_1(t)$ be the corresponding workload when the service policy is non-pre-emptive. Then, the relation $$X'_1(t) \leq X_1(t) + l_{max}$$

follows by a simple sample path argument, where $l_{max}$ is the maximum non-real-time packet length. Therefore $$P(X'_1 > \chi_1) < P(X_1 + l_{max} > \chi_1) = P(X_1 > \chi_1 - l_{max}).$$

Therefore, for the non-pre-emptive case, if the equivalent capacity $\hat{c}_{i,1}$ is computed as $\hat{c}_i(\epsilon_1, \chi_1 - 1_{max})$, then the loss probability $\epsilon_1$ of the real-time traffic is guaranteed. This is a very conservative approach. Using $\chi_1$ even for the non-pre-emptive case should typically lead to better than $\epsilon_1$ performance for real-time traffic for most traffic mixes of real-time and non-real-time traffic.

In accordance with the present invention, the following algorithm is used to admit calls to a link in the packet communications system of FIG. 1.

1. Keep two link vectors $L_1$ and $L_2$ as defined in equations (7) and (8).
2. At every connection set up or removal:
   For real time connections, update both vectors:

$$L_1 \leftarrow L_1 \pm (m_i, \sigma_i^2, \hat{c}_{i,1})$$

$$L_2 \leftarrow L_2 \pm (m_i, \sigma_i^2, \hat{c}_{i,2})$$

For non-real-time connections, update $L_2$ only:

$$L_2 \leftarrow L_2 \pm (m_i, \sigma_i^2, \hat{c}_{i,2})$$

3. Call admission criterion:
   Admit real-time connection if:

$$f(L_1) \leq R_{link} \text{ and } f(L_2) \leq R_{link}$$

Admit non-real-time connection if:

$$f(L_2) \leq R_{link}.$$

This algorithm provides an efficient procedure to update link metric vectors. This efficiency allows for real-time updates while accounting for the difference between priorities of incoming traffic, the relationship between link bandwidth and connection characteristics, and preserving the incremental nature of link metric updates so that information on individual connections need not be maintained.

Generalization of equations (7) and (8) is straightforward for K classes of priority, where $k=1$ is the highest priority level and $k=K$ is the lowest priority level. Bandwidth request vectors for each connection again have the form $$r_i^{(k)} = (m_i, \sigma_i^2, \hat{c}_i^{(k)}) \quad (12)$$

where $\sigma_i^2 = m_i(R_i - M_i)$ and $\hat{c}_i^{(k)}$ is computed from equation (2), assuming different buffer characteristics for each priority class, i.e., different values for $\chi^{(k)}$ and $\epsilon^{(k)}$ for each class k as shown in FIG. 3. The generalized link metric of equation (1) then takes the form:

$$L^{(k)} = \left( \sum_{i \in I^{(k)}} m_i, \sum_{i \in I^{(k)}} \sigma_i^2, \sum_{i \in I^{(k)}} \hat{c}_i^{(k)} \right) \quad (13)$$

where $I^{(k)}$ is the set of connections on the link having the priority class k.

As the connection request message propagates along the computed connection path, it is received in each of the nodes and copied by the route controller 37 (FIG. 3) responsible for managing the bandwidth of the links connected to the node. In this connection, note that a disconnect is simply a negative reservation for the amount of bandwidth originally reserved for the connection. Using the bandwidth reservation vector, the route controller 37 must first determine whether the connection should be accepted or rejected. If accepted, route controller 37 must update the link metric vectors in topology data base 38 for the link to be used in the computed connection path and, if the connection is being added, derive the new link metric vector to be used to decide whether future connections should be accepted or rejected. A computationally efficient algorithm for updating the link metric vectors from the connection request vector is described above. A computationally efficient algorithm for deciding whether the connection should be accepted will now be described. This algorithm is a modified version of the accept-reject algorithm described in the afore-mentioned copending application Ser. No. 07/932,440.

The decision of whether or not to accept a new connection, based on the connection request vector requires that two operations be performed for each link, for one or more priority classes. First, the number of connections with a request vector of $r_i^{(k)}$ that could be statistically multiplexed on the link is computed and compared to the number needed to satisfy the statistical multiplexing assumption. More specifically, the statistical multiplexing assumption used in equation (3) requires that the link be capable of supporting "many" connections similar to the one being added. For any given type of connection, this assumption depends on both the connection characteristics and the total link bandwidth since high bandwidth links can fit more connections, resulting in a greater accuracy of the statistical multiplexing assumption. Once the validity of this assumption has been checked, the request vector to actually be used in updating the link metric can be selected and used to compute the new link metric vector.

Upon receipt of the request vector $r_i^{(k)}$ over a link, the the maximum number of connections with the same request vector which could fit on the next link in the route is given by $$N_i^{(k)} = \max\{n_k; n_k m_i + \alpha_{k'} \sqrt{n_k \sigma_j} \leq R_{link}\}. \quad (14)$$

where $R_{link}$ is the maximum reservable capacity on the link. In general, n and ct are different for different priority classes. Based on whether $N_i^{(k)}$ is greater or smaller than a given minimum value $N_k^*$, the new link metric vector $L'$ is computed. The value of $N_k^*$ should be "large" to approximate the aggregate bit rate distribution necessary to validate the statistical multiplexing assumption. However, since the stationary approximation bandwidth capacity approximation represented by the mean in the first term on the right hand side of equation (3) ignores buffers, the bandwidth capacities are all on the high side and a reasonable error margin can be tolerated. If the statistical distribution of the link metric vector values is assumed to be Gaussian, a value of $N_k^*$ of 10 connections is adequate to insure reasonable accuracy in many circumstances. If there is little or no buffering in the intermediate nodes, a larger number for $N_k^*$ may be needed. In any event, using a heuristically determined value for $N_k^*$, the new link metric vector $L'^{(k)}$ is computed as follows:

$$L'^{(k)} = \begin{cases} L^{(k)} + r_i^{(k)}, & \text{if } N_i^{(k)} \geq N_k^* \\ L^{(k)} + \bar{r}_j^{(k)}, & \text{if } N_i^{(k)} < N_k^* \end{cases} \quad (15)$$

where addition is component-wise and where $\bar{r}_i$ is a modified request vector for those links where the statistical multiplexing assumption does not hold true, and is given by:

$$\bar{r}_i^{(k)} = (\hat{c}_i^{(k)}, 0, \hat{c}_i^{(k)}) \quad (16)$$

It can be seen that equation (16) simply states that the network connections for which the statistical multiplexing assumption does not hold true are treated as constant bit rate connections ($\sigma_i^2 = 0$) with a rate equal to their equivalent capacity as given by equation (2).

The new allocated equivalent bandwidth is easily computed from the updated link metric vector $L'^{(k)}$, using equation (3). When the bandwidth allocated to a network connection is released, the procedure is similar, but subtraction is used in equation (15) instead of addition. These computations can be performed so as to minimize the amount of computation required, essentially by avoiding the costly computation of $N_i^{(k)}$. This procedure is carried out as follows, using equation (6):

1. Upon receipt of a request vector $r_i^l$ for a connection i of priority class l, check the validity of the "large" number of connections assumption for statistical multiplexing (i.e., $N_i^{(l)} < N_i^*$). This is accomplished without computing $N_i^{(l)}$ as follows:

Compute $t_1 = R_{link} - N_i^* M_i$. This calculation is used to determine the amount of the maximum reservable capacity on link ($R_{link}$) remaining after carrying the minimum number ($N_i^*$) of connections, each having the same mean bit rate as the new connection ($m_i$), necessary to support the statistical multiplexing assumption.

If $t_1 \leq 0$, that is, if the link cannot carry $N_i^*$ of such connections, then obtain vector $\bar{r}_i^l$ from equation (16). The link is incapable of carrying the minimum number of connections to warrant the statistical multiplexing assumption, and a constant bit rate bandwidth estimate ($\bar{r}_i^{(k)}$) is used instead of the smaller equivalent bandwidth estimate for statistical multiplexing in the request vector ($r_i^{(k)}$).

Else, compute $t_2 = \alpha'_l{}^2 N_i^* \sigma_i^2$. That is, even if the link will support the mean bit rate of $N_i^*$ connections, will there be enough bandwidth left over to also support the standard deviations for such connections.

If $t_2 \geq (t_1)^2$, then obtain $\bar{r}_i^{(k)}$ from equation (16). That is, if the link cannot also carry the standard deviations for the $N_i^*$ connections, use the constant bit rate bandwidth $\bar{r}_i^{(k)}$.

Else, use $r_i^{(k)}$. If the link will carry both the mean bit rate for the minimum connections and also the standard deviations for the minimum connections, then use the request vector in the request message.

2. If the request is for a connection removal, set $\bar{r}_i^{(k)} = -r_i^{(k)}$ (or $r_i^{(k)} = -\bar{r}_i^{(k)}$).

3. Compute a new link metric vector $L'$ from equation (15), using simple vector addition.

This algorithm provides an efficient procedure to update link metric vectors, requiring at most four additions, three multiplications and two comparisons. This efficiency allows for real-time updates while accounting for the relationship between link bandwidth and connection characteristics and preserving the incremental nature of link metric updates so that information on individual connections need not be maintained. The procedure must, of course, be repeated for all lower priority link metric vectors in order to reflect the loss of bandwidth available to future lower priority connection requests. Higher priority link metric vectors need not be adjusted since the priority classification ensures adequate transmission of the higher priority packets.

Figure 5:
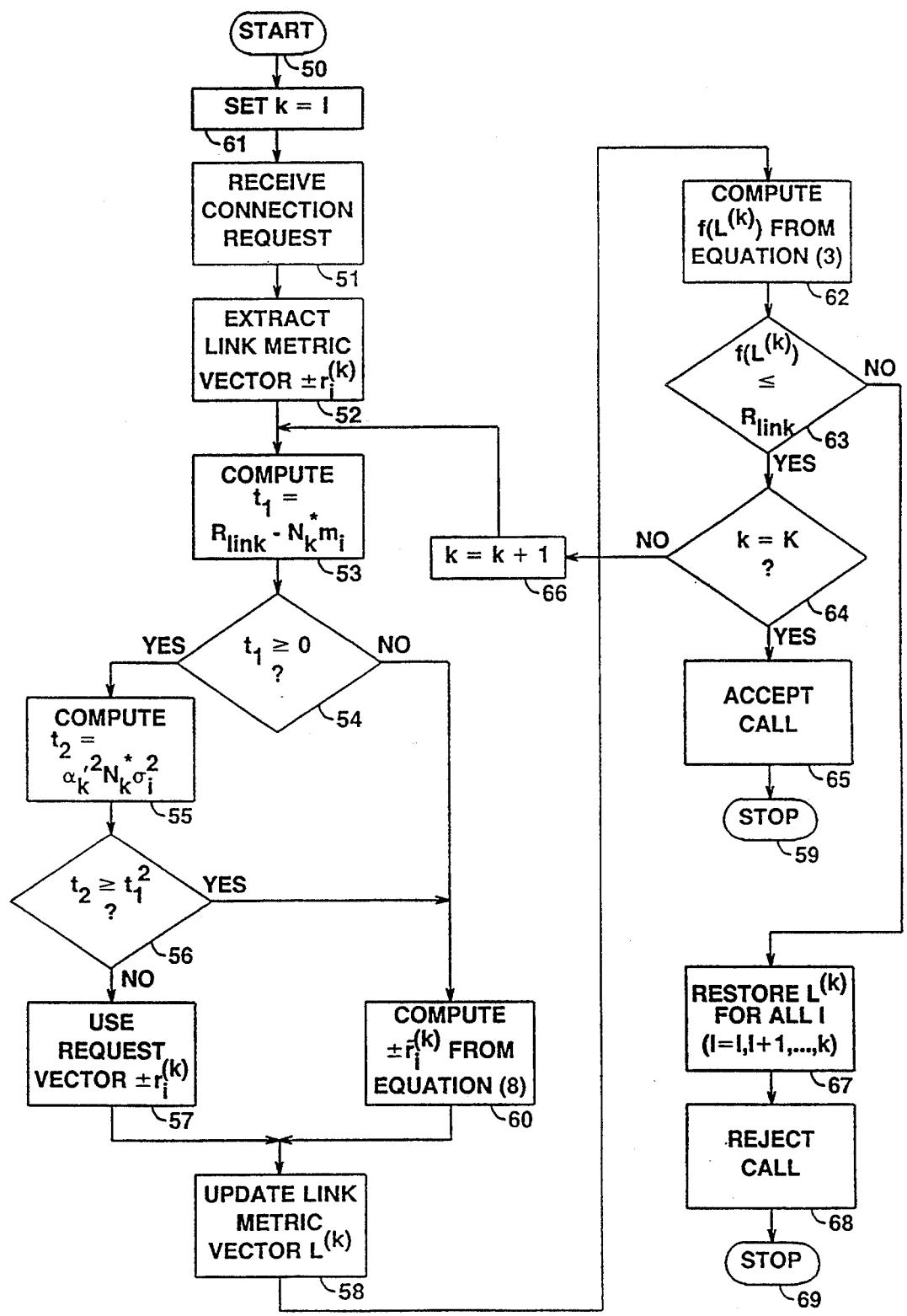
FIG. 5 shows a general flow chart of the process for updating the multiple link metric vectors when a new connection is established.

A flow chart of the algorithm for implementing the multiple priority class link metrics of the present invention is shown in FIG. 5. The procedure of FIG. 5 is used at each node in the path of a new connection which is visited by the connection request message of FIG. 2. Starting at start box 50, box 61 is entered to set the priority k to the value 1 found in the received connection vector. Box 51 is then entered where the connection request message (FIG. 2) is copied at the local node included in the route. In box 52, the request vector $r_i^{(k)}$ is extracted from the connection request message and used, in box 53, to compute the value of $t_1 = R_{link} - N_L * m_i$. In decision box 54, the value of $t_1$ is compared to zero and, if equal to or greater than zero, box 55 is entered where the value of $t_2 = \alpha'_k{}^2 N_k^* \sigma_i^2$ is calculated. In decision box 56, the value of $t_2$ is compared to the square of the value of $t_1$. If $t_2$ is less than $t_1$ squared, box 57 is entered where the link metric incremental vector is set to be equal to the request vector $r^{i(k)}$ received with the connection request message. If, however, $t_2$ is equal to or greater than the square of $t_1$, box 60 is entered where the incremental vector is set to be equal to $\bar{r}_i^{(k)}$, using equation (8). If the value of $t_1$ is less than zero, as determined in box 54, box 60 is also entered to set the link metric incremental vector to the value of $\bar{r}_i^{(k)}$. In either case, the link metric incremental vector is used in box 58 to update the link metric vector for this link by simple component-wise vector addition. Box 62 is then entered to calculate $f(L^{(k)})$ from equation (3). In decision box 63, $f(L^{(k)})$ is compared to $R_{link}$ and, if equal to or smaller, decision box 64 is entered. In decision box 64, the priority class index k is compared to the maximum index value K. If $k = K$, box 65 is entered where the call is accepted and the process terminated in terminal box 59.

If $f(L^{(k)})$ is larger than $R_{link}$, as determined by decision box 63, box 67 is entered where all of the link metric vectors previously incremented or decremented by this connection vector are restored to the values they had prior to the arrival of this connection vector. This can be accomplished by either reversing the component-by-component alterations of the link metric values or by saving the original values and merely restoring these values to the topology database of FIG. 4. Box 68 is then entered to reject the call and the process terminated in terminal box 69.

If the priority class index k is not equal to the maximum priority class index value K, as determined by decision box 64, box 66 is entered where the priority class index k is incremented by one and box 53 is re-entered to repeat the link metric update computations for the next lower priority (next higher value of index k) class metric. This process is continued until all of the lower priority link metrics have been updated, or until the call is rejected because some link metric cannot be accommodated in the remaining bandwidth, as determined by decision box 63. Note that the new connection must be acceptable for all priority classes having a priority class equal to or lower than the priority class of the new connection. A failure to meet any of these criteria results in a rejection of the call.

Note that the process described in the flow chart of FIG. 5 is carried out at each of the nodes along the route selected for the transmission of packets from the source node to the destination node. The capacity to carry out this link metric updating process is therefore resident in all of the nodes of the network of FIG. 1 and invoked each time a connection request message is received at that node. Also note that equation (14) is not solved directly in the procedure of FIG. 5, thereby avoiding a very significant time delay in vector updating.

As disclosed in the above-noted prior copending application Ser. No. 932,440, the link metrics defined above can also used in calculating the parameters of an admission stratagem to control access of the signal source for each connection to the network. That is, if the statistics of a signal source diverge significantly from the characteristics assumed when the connection was established, it becomes possible that congestion will occur in the network. To prevent such congestion, a stratagem such as the leaky bucket stratagem described in the above-noted prior application is used to limit the access of that signal source to the network while the signal source is outside of the assumed statistical values. Such parameters are chosen to achieve transparency of the leaky bucket access controls to the users as long as the traffic remains within the negotiated values, and to control the maximum bandwidth taken by the traffic when that traffic exceeds the negotiated values. These leaky bucket parameters can be calculated in the same manner as that proposed in the afore-mentioned patent application.

It can be seen that the new connection metric vectors defined herein can be used as in the prior art, both to update the link metric vectors for all links along the path of a new connection and, at the same time, be used to calculate the leaky bucket parameters for controlling the access of the new connection to the network. Moreover, since different link metrics are used for each class of connection, the total traffic throughput that can be accommodated by the link can be increased significantly, possible even doubled, without increasing the likelihood of congestion.

It should be dear to those skilled in the art that further embodiments of the present invention may be made by those skilled in the art without departing from the teachings of the present invention.

What is claimed is:

1. A packet communications network including a plurality of switching nodes interconnected by transmission links, and in which data packets are transmitted over multilink paths between a source node and a destination node, said data packets each belonging to one of a plurality of classes of traffic, said packet communications network comprising means for storing, at each said node, a vector representation of the traffic load reserved for those connections in each of said plurality of classes of traffic to be transmitted on each of said transmission links terminating at said node, means for initiating a new connection in said network by propagating a connection request along the route selected for that connection, each said connection request including a vector representing the characteristics of said new connection including the class of service for said new connection, and means responsive to said connection request for updating said vector representation of traffic load for the class of traffic of said connection request and for all lower classes of traffic, said updating taking place by vector addition of said connection request vector to said vector representation of said traffic load at each of said nodes along said route.

2. The packet communications network according to claim 1 further comprising means responsive to said connection request for denying said connection request when the updated representation of the traffic load for any class of traffic on any of said transmission links exceeds the reservable capacity of said transmission link.

3. The packet communications network according to claim 1 wherein said classes of traffic comprise classes of priorities in forwarding said packets through said network.

4. The packet communications network according to claim 3 wherein said classes of priorities include real-time and non-real time information.

5. The packet communications network according to claim 1 wherein said means for updating said representations of link traffic load for a new connection i of traffic class l comprises means for determining the value $t_1$ of a first variable given by $$t_1 = R_{link} - N_l^* m_i$$

where $R_{link}$ is the maximum reservable traffic capacity on the link, $N_l^*$ is a constant for traffic class l representing the number of connection with metrics similar to the metrics of connection i which could be statistically multiplexed on the capacity $R_{link}$, and $m_i$ is the mean of the bit rate for said new connection i, means for comparing the value of said first variable to zero and, if said value is greater than zero, determining the value $t_2$ of a second variable given by $$t_2 = \alpha'^2 N_l^* \sigma_i^2$$

where $\sigma_i$ is the standard deviation of the mean bit rate $m_i$, and $\alpha'$ is given by $$\alpha' \approx \sqrt{2\ln(1/\epsilon_l) - \ln 2\pi}$$

where $\epsilon_l$ is the target buffer oveflow probability for the traffic class l, means for comparing the value of said second variable to the square of said first variable, means for determining an update vector $\tilde{r}_i^{(l)}$ for connection i of traffic class l in which the variance of the bit rate is zero, means for updating said representation with said request vector when said first variable is greater than zero and said second variable is less than the square of said first variable, and means for updating said representation with said update vector $\tilde{r}_i^{(l)}$ otherwise.

6. A method of establishing new connections in a packet communications network including a plurality of switching nodes interconnected by transmission links, and in which data packets are transmitted over multilink paths between a source node and a destination node, said data packets each belonging to one of a plurality of classes of traffic, said method comprising the steps of storing, at each said node, a vector representation of the traffic load reserved for those connections in each of said plurality of classes of traffic to be transmitted on each transmission link terminating in said node, initiating a new connection in said network by propagating a connection request along the route selected for that connection, each said connection request including a vector representing the characteristics of said new connection including class of service for said new connection, and updating, in response to said connection request, said representation of traffic load for the class of traffic of said connection request and for all lower classes of traffic, said updating taking place by vector addition of said connection request vector to said vector representation of said traffic load at each of said nodes along said route.

7. The method according to claim 6 further comprising the step of denying, in request to said connection request, said connection request when the updated representation of the traffic load for any class of traffic on any of said transmission links exceeds the reservable capacity of said transmission link.

8. The method according to claim 6 wherein said classes of traffic comprise classes of priorities in forwarding said packets through said network.

9. The method according to claim 8 wherein said classes of priorities include real-time and non-real time information.

10. The method according to claim 6 wherein said step of updating said representations of link traffic for a new connection i of traffic class l comprises determining the value $t_1$ of a first variable given by $$t_1 = R_{link} - N_l^* m_i$$

where $R_{link}$ is the maximum reservable traffic capacity on said link, $N_l^*$ is a constant for traffic class l representing the number of connections with metrics similar to the metrics of connection i which could be statistically multiplexed on the capacity $R_{link}$, and $m_i$ is the mean of the bit rate for said new connection i, comparing the value of said first variable to zero and, if said value is greater than zero, determining the value $t_2$ of a second variable given by $$t_2 = \alpha'^2_l N_l^* \sigma_i^2$$

where $\sigma_i$ is the standard deviation of the mean bit rate $m_i$, and $\alpha'_l$ is given by $$\alpha'_l \approx \sqrt{2\ln(1/\epsilon_l) - \ln 2\pi}$$

where $\epsilon_l$ is the target buffer overflow probability for the traffic class l, comparing the value of said second variable to the square of said first variable, determining an update vector $\tilde{r}_i^{(l)}$ for connection i of traffic class l in which the variance of the bit rate is zero, updating said representation with said request vector when said first variable is greater than zero and said second variable is less than the square of said first variable, and updating said representation with said update vector $\tilde{r}_i^{(l)}$ otherwise.

11. A node for a packet communications network including a plurality of switching nodes interconnected by transmission links, and in which data packets are transmitted over multilink paths between a source node and a destination node, said data packets belonging to one of a plurality of classes of traffic, said packet communications network node comprising means for storing at said node a vector representation of the traffic load reserved for those connections in each of said plurality of classes of traffic to be transmitted on each transmission link terminating in said node, means for initiating a new connection from said node into said network by propagating a connection request from said node along the route selected for that connection, each said connection request including a vector representing the characteristics of said new connection including the class of service for said new connection, and means in said node responsive to a connection request from other nodes in said network for updating said representation of traffic load for the class of traffic of said connection request and for all lower classes of traffic, said updating taking place by vector addition of said connection request vector to said vector representation of said traffic load at said node.

12. The packet communications network node according to claim 11 further comprising means responsive to said connection request for denying said connection request when the updated representation of the traffic load for any class of traffic on a transmission link in said route exceeds the capacity of said transmission link.

13. The packet communications network node according to claim 11 wherein said classes of traffic comprise classes of priorities in forwarding said packets through said network.

14. The packet communications network node according to claim 13 wherein said classes of priorities include real-time and non-real-time information.

15. The packet communications network node according to claim 11 wherein said means for updating said representations of traffic load for a new connection i of traffic class l comprises means for determining the value $t_1$ of a first variable given by $$t_1 = R_{link} - N_l^* m_i$$

where $R_{link}$ is the maximum reservable traffic capacity on said link, $N_l^*$ is a constant for traffic class l representing the number of connections with metrics similar to the metrics of connection i which could be statistically multiplexed on the capacity $R_{link}$, and $m_i$ is the mean of the bit rate for said new connection, means for comparing the value of said first variable to zero and, if said value is greater than zero, determining the value $t_2$ of a second variable given by $$t_2 = \alpha'^2_l N^*_l \sigma_i^2$$

where $\sigma_i$ is the standard deviation of the mean bit rate $m_i$, and $\alpha'_l$ is given by $$\alpha'_l \approx \sqrt{2\ln(1/\epsilon_l) - \ln 2\pi}$$

where $\epsilon_l$ is the target buffer overflow probability for the traffic class l, means for comparing the value of said second variable to the square of said first variable, means for determining an update vector $r_i^{(l)}$ for connection i of traffic class l in which the variance of the bit rate is zero, means for updating said representation with said request vector when said first variable is greater than zero and said second variable is less than the square of said first variable, and means for updating said representation with said update vector $r_i^{(l)}$ otherwise.

* * * * *